Patented May 19, 1942

2,283,173

UNITED STATES PATENT OFFICE 2,283,173

SYNTHETIC CONTACT MASSES AND THEIR PREPARATION

John R. Bates, Swarthmore, Pa., assignor to Houdry Process Corporation, Wilmington, Del., a corporation of Delaware No Drawing. Application November 17, 1937, Serial No. 174,966

16 Claims. (Cl. 252—254)

The present invention relates to zeolites and their preparation, particularly by wet methods. More particularly it is concerned with the production of contact masses capable of influencing fluid reactions through catalytic ability, chemical activity and/or adsorptive capacity and being free or substantially free of alkali metal components normally present in zeolites. It is directed particularly toward the preparation of synthetic contact masses from soluble silicates and compounds of amphoteric metals in which the latter are present in an anion.

Certain zeolites prepared from such reactants, for example, from sodium silicate and sodium aluminate possess qualities including high adsorptive capacity which render them valuable starting materials for contact masses, but their content of sodium tends to lower their value for use as or in contact masses which exert catalytic influence over some chemical reactions, including the transformation of higher boiling oils into motor fuel. Furthermore, the alkali metal oxide is present in comparatively large quantities necessitating the use of excessive amounts of material capable of removing the same and a substantial proportion of such alkali metal is often extremely difficult and even practically impossible to remove by simple zeolitic action. In my copending application Serial No. 170,648, filed October 23, 1937, there is disclosed a process for preparing from artificial zeolites contact masses which are free or substantially free of non-nuclear substance originally present in the zeolite involving the formation of a zeolite from reacting ingredients containing an anion formed from a non-amphoteric element and removal of non-nuclear components of the zeolite by base exchange with a solution of a compound containing a volatile or unstable cation. The present invention provides a particular method of including suitable anions in the reacting solutions and deals primarily with the cations to which the anions may be bound.

It has been proposed in preparing zeolites having high base exchange capacity and suitable for use in water softening processes to include in the reacting solutions, in addition to the zeolite forming ingredients (soluble silicate and soluble amphoterate), soluble compounds containing an anion formed from a non-amphoteric element. For example, a solution of sodium sulphate has been mixed with one of the reacting solutions prior to gellation or precipitation. The resulting zeolite contained a still greater amount of alkali metal.

One object of the present invention is to devise an improved method for producing zeolites from soluble silicates and amphoterates or alkaline compounds of amphoteric elements. Another object is to prepare zeolites of this type capable of having substantially all their content of alkali metal removed by simple zeolitic action. Another object is to prepare by simple gellation, coagulation, precipitation or the like zeolites having a high base exchange capacity and containing reduced amounts of alkali metal oxide. Another object is to realize high yields of zeolitic materials. Still another object is to control the composition of the nuclear and non-nuclear portions of the zeolite. Other objects will be apparent from the detailed discussion which follows.

The invention involves including in the reactant solutions a compound capable of simultaneously forming a volatile hydroxide or base and a salt by metathesis with the caustic alkali present in the reactants. Such compound must be incapable of dissolving nuclear substance by acid reaction and may be a salt which forms a neutral or practically neutral solution and which is volatile or contains a volatile cation preferably forming a weak base, as for example, the ammonium or certain amino cations. Among the salts which are capable of producing the desired results are the nitrate, sulphate, carbonate, acetate and chloride of ammonium and methyl or ethyl amino hydrochloride. The result of the metathesis between the alkali and the salt is the formation of a neutral alkali salt and the weak base which is retained to its limit of solubility. Therefore the resulting reaction product will always be alkaline but less alkaline than the solutions containing nuclear substances. The inclusion of such salt solutions in the reactants for forming the zeolite provides control over the yield and composition of nuclear components, the composition and amount of non-nuclear portions of the zeolite, and the base exchange capacity of the latter.

The advantages of the invention may be realized to a certain extent when a solution of a compound of the above described type is added to the soluble silicate or to the alkaline solution of the amphoterate. The best results are obtained and economies of process are realized, however, when the silicate and amphoterate solutions are mixed in such proportions and concentrations that a sol is formed which does not precipitate or gel for an appreciable length of time as from 5 seconds to 30 minutes or more. A solution of the selected compound is added to the sol before gellation or precipitation is complete and preferably before formation or separation of solid has taken place to substantial extent. Immediately after or practically simultaneously with the addition of the chosen solution a gel or coagulum is formed which may be dried and washed in any desired manner.

In practising the preferred embodiment of the invention, the fact that coagulation, gellation or precipitation is incomplete or even substantially non-existent prior to the addition of the selected salt permits thorough and uniform molecular dispersion of the nuclear and non-nuclear forming components of the sol by a simple stirring action or its equivalent and even, in some instances, by the simple act of commingling the two solutions. The coagulum is then of uniform composition throughout its structure. Furthermore, coagulants of the type described tend to form precipitates when added to either of the reacting solutions except when such solutions are extremely dilute. Formation of the sol prior to addition of the coagulating compound permits use of concentrated solutions of the zeolite forming compound and of the coagulant. Therefore economies of process in preparing the washed and dried zeolite are the result.

In considering, by way of example, the addition of a solution of a salt containing the ammonium or other cation, such as ammonium chloride, to a sol comprising sodium silicate and sodium aluminate, even though the components of the sol be so proportioned as to produce a zeolite containing as much as 9% by weight of sodium oxide, the latter can be easily reduced by base exchange to 1% by weight or less when the ammonium ion of the salt is present in an amount stoichiometrically equivalent to 0.2 of the amount of sodium oxide present in the sol. If the equivalent amount of the ammonium ion be as much as 0.5, the sodium oxide content of the zeolite may be reduced to 0.75% and usually appreciably below this amount, while with the ammonium ion present in an amount at least equivalent to the sodium, the residual sodium oxide content of the zeolite after base exchange is usually 0.5% or below and often is as low as 0.2%, which latter amount is within the limits of error of the accepted methods of analysis and may therefore be considered as virtual exhaustion.

When the coagulant is used in an amount in excess of a certain minimum the silica to alumina ratios in the dried and washed zeolite remain substantially unchanged from the ratio in which these materials were present in the reacting solutions over a wide range of such ratios. Also, the total yield of nuclear substances approaches the theoretical when at least this minimum amount of coagulant is employed. The best yields and smallest change in ratios of nuclear components are obtained when the coagulum is dried before washing. The yield of nuclear portions of the zeolite increases rapidly when the equivalent amount of the ammonium ion is increased from 0.2 to 0.5 and thereafter increases gradually with the addition of larger amounts of the ammonium salt. When approximately 0.5 of the sodium equivalent of ammonium is used, the yield of silica and an amphoteric oxide such as alumina in the washed and dried zeolite is of the order of 90% or more. With the use of approximately 1.5 times the alkali metal equivalent of ammonium the finished zeolite may contain as much as 97% of the original nuclear forming material.

The zeolitic material prepared according to the invention usually produces absorbent materials of great value for use as or in contact masses which exert catalytic or chemical influence over fluid reactions when the volatile cation in the coagulant is at least stoichiometrically equivalent to the alkali metal content of the sol. This amount of cation insures, in most instances, reduction of the alkali metal oxide content of the zeolite to a residue of 0.5% sodium oxide or its equivalent and recovery of at least 90% of the nuclear zeolitic components. In general, these results are realized when the ingredients of the zeolite, including the selected coagulant, are so proportioned that the coagulum has a pH value within the range of 9 to 11. The residual sodium oxide may be kept below 1% when pH values in excess of 11, as for example, up to 12, are used; however, in such instances the zeolite is sometimes produced at the expense of somewhat decreased yield of nuclear substances which are then present in a new but predictable ratio. As long as the pH value and amounts of coagulant utilized in preparing zeolites of the general type described are within the ranges specified, the ease of removal of alkali metal from the zeolite and other important advantages of the invention are realized when the proportionate amounts of silica and amphoteric metal oxide are present in the coagulum in the range of molar ratios of 4:1 to 16:1 or higher.

The volatile or unstable cation of the base formed from the coagulant provides a portion of the non-nuclear or base exchanging components of the coagulum, displacing a part of the alkali metal which would normally become zeolitically held therein. In some instances, and particularly when the coagulum has a pH value of 10 or below, the ammonium displaces sodium oxide to an extent as high as 1.5% by weight of the zeolite. This zeolitically held ammonium may be easily driven off upon the application of heat at temperature substantially in excess of that required for drying, which temperature, as stated in my aforesaid copending application, Serial No. 170,648, filed October 23, 1937, should be at least 700° F., as within the range of 700° F. to 1050° F. before effecting removal of more alkali metal by zeolitic action, or, it may be allowed to remain in the zeolite during such treatment particularly when effected with a solution containing a volatile or unstable cation which is the same as or similar to that in the coagulant. In either event, economy of material used to rid the zeolite of its contained alkali metal is realized.

The product of the invention, preferably in dried and washed form, comprising the zeolitic nucleus holding alkali metal and a volatile cation in base exchanging relation is, of course, valuable for use in known processes for treating water by zeolitic softening agents, but it is particularly valuable and peculiarly well adapted for further treatment to produce contact masses having chemical activity, catalytic ability, high adsorptive capacity or any desired combination of these properties. The zeolite as prepared has base exchange capacity in excess of its content of alkali metal oxide. It may be treated to produce a contact mass substantially free of non-nuclear components or constituents originally present and comprising essentially the zeolitic nucleus or such nucleus zeolitically holding any desired amount of any metal capable of entering the zeolite by base exchange up to that amount equivalent to its full base exchange capacity. The ultimate product may contain a non-nuclear metal or metal oxide capable of entering into or promoting chemical reactions, in an amount equivalent to the full base exchange capacity of the zeolite, in which event the latter may be treated with a solution containing a cation of any desired metal or oxide, for example, of Cu, Co, Ni, Ca, Fe, Cr, V, Mn, Mo, W, Li, Ti, etc., until base exchange is complete. If smaller quantities of such added active components are desired, an excellent method of incorporating them in the zeolite is to rid the latter of its alkali metal content by base exchange with a solution containing a volatile or unstable cation which preferably is of the same type as previously mentioned herein for coagulation, then to introduce thereinto by base exchange the desired amount of metal or oxide, and subsequently to drive off the remaining volatile or unstable cation.

The following examples give concrete illustrations of the invention.

Example 1

A solution of soluble silicate comprising about 281 parts by weight of commercial water glass having a specific gravity of 1.4 and containing about 28.5% by weight of silica and approximately 900 parts by weight of water was prepared. This solution was mixed with a solution of sodium aluminate made by dissolving about 35 parts by weight of commercial aluminate containing about 57% by weight of alumina in 670 parts by weight of water. To the resulting sol which contained silica and alumina in the weight ratio of about 4:1 there was added with stirring about 301 parts by weight of a 22% solution of ammonium chloride. This salt solution contained ammonium which was about stoichiometrically equivalent to the sodium content of the sol, and, within about 15 seconds after its addition, the sol set up to an all embracing gel which had a pH value of the order of 9.4. The gel was then dried and washed practically free of excess salt. Upon analysis the resulting zeolite was found to contain on the anhydrous basis about 3.5% by weight of sodium oxide, about 1% by weight of zeolitically held ammonium, and silica and alumina in the weight ratio of approximately 3.95:1, these nuclear components being present in the zeolite in an amount which was about 95% by weight of the quantity in which they were present in the sol.

This product was then treated four times with 5% solutions of ammonium chloride and washed. A portion of the treated product was then heated to about 1050° F. to drive off adsorbed and zeolitically held ammonia and the resulting highly adsorptive material containing approximately 0.25% by weight of sodium oxide was utilized in molded form as a catalyst for promoting the transformation of higher boiling oils into high anti-knock gasoline in an operation involving alternate periods of transformation and regeneration of the contact mass by combustion of carbonaceous deposits formed thereon and therein. It was found to maintain a high level of activity even after several hundred repetitions of the alternating cycle.

Example 2

Approximately 12,850 parts by weight of a silica-alumina sol containing about 713 and 78 parts by weight of silica and alumina, respectively, was prepared from solutions of commercial grades of sodium silicate and sodium aluminate similar to those used in Example 1. A 29% solution of ammonium chloride containing ammonium in an amount which was about stoichiometrically equivalent to the sodium content of the sol was made and then added to the sol before gellation was complete. The resulting zeolitic coagulum which formed immediately had a pH value of about 9.6, and after being dried and washed it was found to contain the non-nuclear substances, sodium oxide and ammonium, in the respective weight percentages of about 2.8 and 0.9 (anhydrous basis). It contained silica and alumina in an amount which was in excess of 90% by weight of the total quantity of these components in the reactant solutions. These substances were present in the zeolite in practically the same ratio as in the sol. The sodium oxide content of the zeolite was reduced to a trace by four successive treatments with a 10% ammonium chloride solution followed by water washing, and was then heated to drive off substantially all the ammonium and to yield a contact mass having selective adsorptive properties capable of promoting transformation of hydrocarbons and giving high yields of the desired end product.

Example 3

17,000 parts by weight of a silica-alumina sol containing approximately 902 parts by weight of silica and about 98 parts by weight of alumina was prepared from solutions of commercial grades of sodium silicate and sodium aluminate similar to those described in Example 1. To this sol there was added with vigorous stirring about 3600 parts by weight of a 25% solution of ammonium nitrate. Practically simultaneously with the addition of the ammonium salt solution a coagulum having a pH value of about 9.5 was formed. This coagulum was then dried at low temperature and washed free of excess salts. Upon analysis it was found to contain the non-nuclear components sodium and ammonium in an amount stoichiometrically equivalent to about 5% by weight of sodium oxide (anhydrous basis) and the nuclear components silica and alumina in the weight ratio of about 910:98. The yield of these nuclear substances, based on the amount of nuclear forming material in the sol, was in excess of 90% by weight. This zeolite was molded into small cylinders and then treated with four successive 5% solutions of ammonium chloride with intervening washing steps, and, after a final washing, the treated material was heated to about 1050° F. and held at that temperature for approximately 2 hours. The resulting highly adsorptive molded contact mass, which contained approximately only 0.2% by weight of sodium oxide (ignited basis) in addition to silica and alumina, was found to be capable of promoting transformation of higher boiling hydrocarbons into valuable lower boiling products including motor fuel, of promoting polymerization of ordinarily gaseous unsaturated hydrocarbons into valuable liquid products, of effecting improvement in the anti-knock rating of motor fuels by molecular rearrangement, and of maintaining a high level of activity when used for the above purposes in a successively repeated operating cycle involving alternate on-stream and regeneration periods, in which latter periods burnable deposits were removed by combustion.

Example 4

Another zeolite was prepared by coagulation of a sol comprising solutions of commercial brands of sodium silicate and sodium aluminate similar to those utilized in Example 1 with a solution of ammonium chloride. To about 11,600 parts by weight of the sol containing about 700 and 95 parts by weight of silica and alumina, respectively, there was added a 10% solution of the ammonium salt containing approximately 290 parts by weight of ammonium chloride. The ammonium content of this solution was equivalent to about one half the sodium content of the sol. The resulting coagulum which had a pH value of about 10.6 contained the non-nuclear components or constituents, sodium oxide and ammonium, in an amount stoichiometrically equivalent to about 6.3% by weight of sodium oxide (ignited basis) and the nuclear components silica and alumina in a quantity representing approximately 90% of the total amount of these materials present in the sol, these components being present in the ratio of about 700 parts by weight of silica to 110 parts by weight of alumina.

This zeolite was subjected to base exchange with the ammonium ion by four successive treatments with a 5% solution of ammonium chloride, was then washed and treated with a 10% solution of nickel nitrate. The modified coagulum zeolitically holding about 0.5% by weight of sodium oxide and of the order of 5% by weight of nickel oxide, and the volatile cation of ammonium in a total amount equivalent to approximately 1.7% by weight of sodium oxide, was then heated to drive off substantially all of the volatile cation. The resulting contact mass was used with a marked degree of success in the refining of gasoline and other hydrocarbon mixtures. In refining gasoline it was found capable of producing a sweetened material having improved color, reduced gum content and increased stability to oxidation.

If desired, contact masses obtained by treatment of the zeolite prepared according to the invention may be utilized in fluid contacting operations in molded form. Any known or desired method of molding or shaping such masses may be followed. One molding process which has produced excellent catalysts having properties, including high porosity and mechanical strength, suitable for commercial use is that disclosed in the copending application of G. R. Bond, Jr., Serial No. 83,309, filed June 3, 1936, which issued on February 14, 1939, as Patent No. 2,146,718, and reissued on January 14, 1941, as Patent No. Re 21,690 in which upwards of 60% of the zeolite as coagulated or precipitated is dried, mixed with the remaining and wet portion of the coagulum and then formed into pieces of the desired size and shape in any suitable manner, as by extrusion.

The uses of products of the invention are by no means limited to the above indicated treatments of hydrocarbons, but find wide application in the entire field of chemical industry including use as or in catalysts and other contact masses for the controlled oxidation or hydrogenation of hydrocarbons and their derivatives, the synthesis of ammonia and sulphuric acid, the purification of gases by adsorption and/or chemical reaction, the catalytic combustion of carbon monoxide, the synthesis of hydrocarbons and their derivatives from carbon monoxide and hydrogen, etc. Nor do the products of the invention embrace only materials obtained by interreaction of sodium silicate and an alkaline solution of alumina but they include reaction products of any soluble silicate and of any other metal oxide capable of forming a true alkaline solution such, for example, as the oxides of lead, tin, chromium, tungsten and vanadium.

Use of contact masses of the nature disclosed herein to promote formation of valuable decomposition products from hydrocarbons is disclosed and claimed in my copending applications, Serial No. 310,762, filed December 23, 1939; Serial No. 365,923, filed November 16, 1940; and Serial No. 365,924, filed November 16, 1940, each of which is in part a continuation of my aforesaid copending application Serial No. 170,648, filed October 23, 1937.

I claim as my invention:

1. In preparing stable synthetic contact masses the process comprising mixing a soluble silicate and an alkaline solution of an amphoteric metal oxide in such proportion and concentration that no precipitate or gel is formed for an appreciable time, producing a coagulum from the resulting sol by adding thereto before substantial precipitation or gel formation takes place a coagulant comprising a solution of a compound of a volatile cation which reacts by metathesis with the alkali content of said sol to form a volatile base and a salt, controlling the quantity of said compound to at least two tenths the stoichiometric equivalent of the alkali metal content of said sol to place substantially all the alkali metal oxide content of the coagulum in base exchangeable position, and reducing the alkali metal content of the zeolite to below the amount molecularly equivalent to 1% by weight of sodium oxide by base exchanging it with a base exchanging solution incapable of dissolving said silica or amphoteric metal oxide by acid reaction.

2. Process according to claim 1, wherein the coagulating compound contains a cation selected from the group consisting of ammonium and amines.

3. In the preparation of synthetic contact masses, the steps comprising mixing a solution of a soluble silicate with an alkaline solution of an amphoteric metal oxide in such proportion and concentration that substantially no gel or precipitate forms for a period of at least five seconds, adding to the resulting sol before substantial gel formation or precipitation takes place a solution containing a neutral salt which reacts by metathesis with alkali metal in said sol to form a volatile base and a salt, said solution being added in sufficient quantity to produce a zeolitic coagulum, so controlling the quantity of said natural salt to at least half the stoichiometric equivalent of the alkali metal content of said sol as to place substantially all the alkali metal oxide content of the coagulum in base exchangeable position, drying said coagulum and effecting substantially complete removal of said alkali metal oxide by base exchanging the dried coagulum with a base exchanging solution incapable of dissolving silica or said amphoteric metal oxide by acid reaction.

4. In the preparation of stable and active synthetic catalysts, the steps comprising forming a sol by mixing a soluble silicate solution and an alkaline solution of an amphoteric oxide, adding to said sol before substantial gellation or precipitation takes place therein a solution of an ammonium salt in sufficient quantity to produce a zeolitic coagulum, so controlling the quantity of said salt to at least the metathetic stoichiometric equivalent of the alkali metal oxide content of said sol as to place substantially the entire alkali metal oxide content of the coagulum in base exchangeable position, and subjecting the zeolite to base exchange with a solution incapable of dissolving silica or said amphoteric oxide by acid reaction and containing a volatile cation selected from the group consisting of ammonium and amines until the alkali metal content of the zeolite is reduced below the amount molecularly equivalent to 1% by weight of sodium oxide.

5. In the production of stable catalysts containing silica and alumina in controlled proportions the steps comprising preparing a sol containing silica and alumina in substantially the desired ratio by mixing a soluble silicate solution with an alkaline solution of alumina, adding to said sol before precipitation or gel formation takes place to substantial extent a solution of ammonium chloride in sufficient amount to effect precipitation of a zeolitic coagulum, so controlling the quantity of said ammonium chloride to at least half the metathetic stoichiometric equivalent of the alkali metal content of said sol as to place substantially the entire alkali metal oxide content of the coagulum in base exchange position, drying said coagulum, washing excess salts therefrom, and then reducing the total alkali metal content of the zeolite to an amount below that molecularly equivalent to 1% by weight of sodium oxide by treating it with a base exchange solution incapable of dissolving silica or alumina by acid reaction.

6. In the production of synthetic catalysts, the process steps comprising mixing a solution of a soluble silicate with an alkaline solution of an amphoteric oxide in such proportion and of such concentrations as to form a sol which does not gel or precipitate for at least five seconds, adding to the sol before substantial formation of solid takes place therein a solution of a compound which enters into metathesis with the alkali present in the sol to form a volatile base and a salt in sufficient quantity to produce a zeolitic coagulum, controlling the quantity of said compound to an amount above that equivalent to two-tenths the stoichiometric equivalent of the alkali content of said sol to place substantially the entire alkali metal oxide content of said coagulum in base exchange position, base exchanging said coagulum with a solution of a neutral salt of a volatile cation until its content of alkali metal oxide is reduced below the amount molecularly equivalent to 1% by weight of sodium oxide, and subjecting the modified zeolite to heat treatment at temperature of at least 700° F. to drive off said volatile cation and to leave a product consisting of the substantially pure nucleus of the zeolite.

7. In preparing active and stable contact masses consisting essentially of blends of silica and alumina in substantially pure form, the process steps comprising preparing a sol from solutions of sodium silicate and sodium aluminate, adding to said sol before precipitation or gellation has taken place a solution of a salt which enters into metathesis with the alkali present in the sol to form a volatile base and a salt, said added salt being selected from the group consisting of ammonium chloride and ammonium sulphate and utilized in quantity sufficient to produce a zeolitic coagulum, controlling the quantity of said added salt to an amount stoichiometrically equivalent to at least half the alkali metal content of said sol and sufficient to place substantially the entire sodium oxide content of the coagulum in base exchange position, drying said coagulum, washing excess salt therefrom, base exchanging the dried and washed material with ammonium chloride solution until its total content of sodium oxide is below 1% by weight, and subjecting the treated material to high temperature heat treatment to drive off substantially all ammonium held therein.

8. In the preparation, from a solution of a soluble silicate and an alkaline solution of an amphoteric oxide, of a catalyst for promoting organic reactions which leave contaminating deposit thereon and capable of maintaining a high degree of activity after repeated regenerations by burning of said deposit, the steps comprising combining said solutions in such proportion and concentrations that they form a sol, before coagulation has taken place to substantial extent within the sol adding thereto an ammonium salt solution containing the ammonium cation in an amount sufficient to produce a precipitate, controlling the quantity of said salt to an amount sufficient to enter into metathesis with substantially all the alkali metal oxide in said sol and to place substantially the entire alkali metal oxide content of said precipitate in base exchange position, and thereafter base exchanging said precipitate with a solution of a salt until its total alkali metal content is reduced to an amount below that molecularly equivalent to 1% by weight of sodium oxide.

9. In the preparation of catalysts from a solution of a soluble silicate and an alkaline solution of an amphoteric oxide, the steps comprising combining said solutions in such proportion and concentrations as to form a sol, before coagulation has taken place to substantial extent within the sol adding thereto an ammonium salt solution in such quantity as to produce a zeolitic coagulum, controlling the quantity of said salt to an amount sufficient to enter into metathesis with substantially all the alkali metal oxide present in said sol to place substantially the entire alkali metal oxide content of the coagulum in base exchange position, base exchanging said coagulum with a solution of an ammonium salt until said oxide is reduced to an amount below that molecularly equivalent to 1% by weight of sodium oxide, and thereafter subjecting the modified coagulum to heat treatment to drive off zeolitically held ammonium and to yield a catalyst consisting essentially of the nucleus of the zeolite of substantially unchanged composition and substantially free of zeolitically held components or constituents.

10. In preparing synthetic catalysts for promoting hydrocarbon decompositions and capable of maintaining high activity for extended periods of use involving repeated and frequent regenerations by burning of deposit formed thereon as a result of the decomposition reactions, the process steps comprising combining a soluble silicate solution and an alkaline solution of an amphoteric oxide to form a sol, before precipitation has taken place to substantial extent in said sol, producing a zeolitic coagulum by adding to said sol a coagulant comprising a neutral salt selected from the group consisting of ammonium nitrate, ammonium sulphate, ammonium carbonate, ammonium acetate and ammonium chloride, controlling the quantity of said coagulant to an amount equivalent to at least one half the alkali metal oxide content of said sol and sufficient to place substantially the entire alkali metal content of the coagulum in base exchange position, and subsequently base exchanging the resulting zeolitic coagulum with a solution of an ammonium compound selected from the above group until the total alkali metal content of the zeolite is reduced below that amount molecularly equivalent to 1% by weight of sodium oxide.

11. In preparing synthetic catalyst for promoting hydrocarbon reactions and capable of maintaining high activity for extended periods of use involving repeated and frequent regenerations by burning of deposit formed thereon as a result of the reactions, the process steps comprising combining a soluble silicate solution and an alkaline solution of an amphoteric oxide to form a sol, before coagulation has taken place to substantial extent in said sol, coagulating the same by adding thereto a coagulant which enters into metathesis with the alkali in the sol comprising a neutral salt selected from the group consisting of ammonium nitrate, ammonium sulphate, ammonium carbonate, ammonium acetate and ammonium chloride, controlling the quantity of said coagulant to an amount stoichiometrically equivalent to at least half the alkali metal content of said sol sufficient to place substantially the entire alkali metal oxide content of the coagulum in exchangeable form, and thereafter base exchanging said coagulum with a solution of ammonium salt until the total alkali metal content of the zeolite is reduced below that amount molecularly equivalent to 1% by weight of sodium oxide.

12. In preparing synthetic catalyst for promoting hydrocarbon reactions and capable of maintaining high activity for extended periods of use involving repeated and frequent regenerations by burning of deposit formed thereon as a result of the reactions, the steps comprising combining a soluble silicate solution and an alkaline solution of an amphoteric oxide in such proportion and concentrations as to form a sol, before coagulation has taken place to substantial extent in said sol adding thereto a coagulant comprising a neutral salt selected from the group consisting of ammonium nitrate, ammonium sulphate and ammonium chloride sufficient in quantity to form a zeolitic coagulum, controlling the quantity of said coagulant to an amount sufficient to enter into metathesis with substantially all the alkali metal of said sol and to place practically the entire alkali metal oxide content of the coagulum in base exchange position, thereafter base exchanging the coagulum in dried condition with a solution of ammonium salt until the total alkali metal content of the zeolite is reduced below the amount molecularly equivalent to 1% by weight of sodium oxide, and subsequently heating the treated coagulum to a temperature of at least 700° F. to drive off said ammonium.

13. In preparing heat stable synthetic contact masses, the process steps comprising combining a soluble silicate solution and an alkaline solution of an amphoteric oxide in such proportion and concentrations as to form a sol, before substantial formation of solid takes place in said sol adding thereto sufficient ammonium sulphate to produce a zeolitic coagulum at pH below 11, controlling the quantity of ammonium sulphate to place substantially the entire alkali metal oxide content of the coagulum in base exchange position, and thereafter base exchanging said coagulum with a solution of ammonium salt until its total content of alkali metal is reduced below the amount molecularly equivalent to 1% by weight of sodium oxide.

14. In the preparation of catalyst for hydrocarbon conversions capable of maintaining high activity in extensive use involving repeated regenerations by combustion of burnable deposit formed thereon as a result of the hydrocarbon conversions, the steps comprising combining a solution of soluble silicate and an alkaline solution of an amphoteric oxide in such proportion and concentrations as to form a sol, before precipitation has taken place to substantial extent within the sol adding thereto sufficient ammonium salt solution to produce a zeolitic coagulum, controlling the quantity of said salt to an amount at least the metathetic stoichiometric equivalent of the alkali metal oxide present in said sol and sufficient to place substantially the entire alkali metal oxide content of the coagulum in exchangeable position, base exchanging said coagulum with a solution of a salt selected from the group consisting of ammonium chloride, ammonium nitrate and ammonium sulphate until the amount of said oxide is reduced below that molecularly equivalent to 0.5% by weight of sodium oxide, and thereafter subjecting the modified coagulum in dried condition to a temperature in the range of 700° to 1050° F. to drive off zeolitically held ammonium and to yield a contact mass consisting of the substantially pure nucleus of the zeolite substantially free of alkali metal components or constituents.

15. In the preparation of adsorptive synthetic catalysts consisting essentially of silica and alumina for treatment or conversion of hydrocarbons capable of maintaining high activity in extensive use involving repeated regenerations by combustion of burnable deposit formed thereon as a result of the hydrocarbon reactions, the process comprising preparing a sol from solutions of sodium silicate and sodium aluminate, adding to said sol before substantial precipitation or gellation has taken place ammonium sulphate solution to produce a coagulum by metathetic reaction, controlling the quantity of said ammonium sulphate to an amount equivalent to at least half the sodium content of the sol and sufficient to place substantially all the alkali metal in the coagulum in exchangeable position, base exchanging the dried and washed coagulum with an ammonium salt solution until the sodium oxide content of said material is reduced below 0.5% by weight, and thereafter subjecting the treated material in dry form to extensive heat treatment at temperature above 700° F. to drive off substantially all ammonium held therein.

16. In the preparation of stable synthetic contact masses, the steps comprising mixing solutions of a soluble silicate and an alkali metal amphoterate in such proportion and concentration that no gel or coagulum forms for a period of at least five seconds, adding to the resulting sol before gellation or precipitation takes place a solution of a chemically neutral salt containing a cation selected from the group consisting of ammonium and amines in amount sufficient to produce a zeolitic coagulum at pH below 11, controlling the quantity of said salt to an amount above that stoichiometrically equivalent metathetically to 0.2% the alkali metal oxide content of the sol and sufficient to place substantially all the alkali metal oxide content of the coagulum in exchangeable position, and base exchanging said coagulum with a chemically neutral base exchanging salt until it is substantially free of said alkali metal oxide.

JOHN R. BATES.